United States Patent
Campbell

(12) 
(10) Patent No.: US 6,390,490 B1
(45) Date of Patent: May 21, 2002

(54) QUICK CONNECT TRACTOR HITCH COUPLING

(76) Inventor: Van Campbell, 204 Sanfers Rd., Pendleton, SC (US) 29670

( * ) Notice: Subject to any disclaimer, the term of this patent is extended or adjusted under 35 U.S.C. 154(b) by 0 days.

(21) Appl. No.: 09/815,174

(22) Filed: Mar. 22, 2001

(51) Int. Cl.$^7$ .......................... B62C 11/00; B60D 1/173; B60K 25/08
(52) U.S. Cl. ....................... 280/510; 280/508; 280/186; 180/53.3
(58) Field of Search ................................. 280/510, 508, 280/504, 491.2, 491.1, 477, 186; 180/53.3; 403/292; 172/439, 677, 272

(56) References Cited

U.S. PATENT DOCUMENTS

| | | | | |
|---|---|---|---|---|
| 3,512,665 A | * | 5/1970 | Westendorf | 172/273 |
| 3,940,167 A | * | 2/1976 | Pilz | 280/491.3 |
| 5,149,122 A | * | 9/1992 | Helber | 280/491.2 |
| 5,586,702 A | | 12/1996 | Sadler | 224/521 |
| 5,599,035 A | * | 2/1997 | Spence | 280/508 |
| 5,647,441 A | | 7/1997 | Gibbons | 172/439 |
| 5,738,176 A | | 4/1998 | Gingerich | 172/274 |
| 5,743,339 A | * | 4/1998 | Alexander, III | 172/439 |
| 5,901,792 A | | 5/1999 | Halabiya et al. | 172/680 |
| 6,095,544 A | * | 8/2000 | Flater | 280/508 |
| 6,099,017 A | * | 8/2000 | Schooler | 280/510 |

FOREIGN PATENT DOCUMENTS

| | | | | |
|---|---|---|---|---|
| FR | 1 194 025 | * | 5/1959 | 280/510 |

* cited by examiner

Primary Examiner—Brian L. Johnson
Assistant Examiner—Matt Luby
(74) Attorney, Agent, or Firm—McNair Law Firm, P.A.

(57) ABSTRACT

A quick hitch coupling for use with a powered machine and a drawn machine. The coupling comprises a receiving unit attached to forward end of an implement in a substantially stationary position and an engaging unit attached to the powered machine which may be lowered and raised. The receiving unit comprises a cavity defined between a substantially vertically disposed rear plate laterally spaced from a substantially vertically disposed front plate. The engaging unit attaches to the powered machine so as to be movable between an elevated operative engaged position and a lowered disengaged position. The engaging unit includes a substantially vertical plate of a size and shape to fit within, and substantially fill, the cavity of the receiving unit. The engaging unit may thereby be positioned in its lowered position beneath the cavity of the receiving unit and raised to its operative position into coupled engagement with the receiving unit.

24 Claims, 7 Drawing Sheets

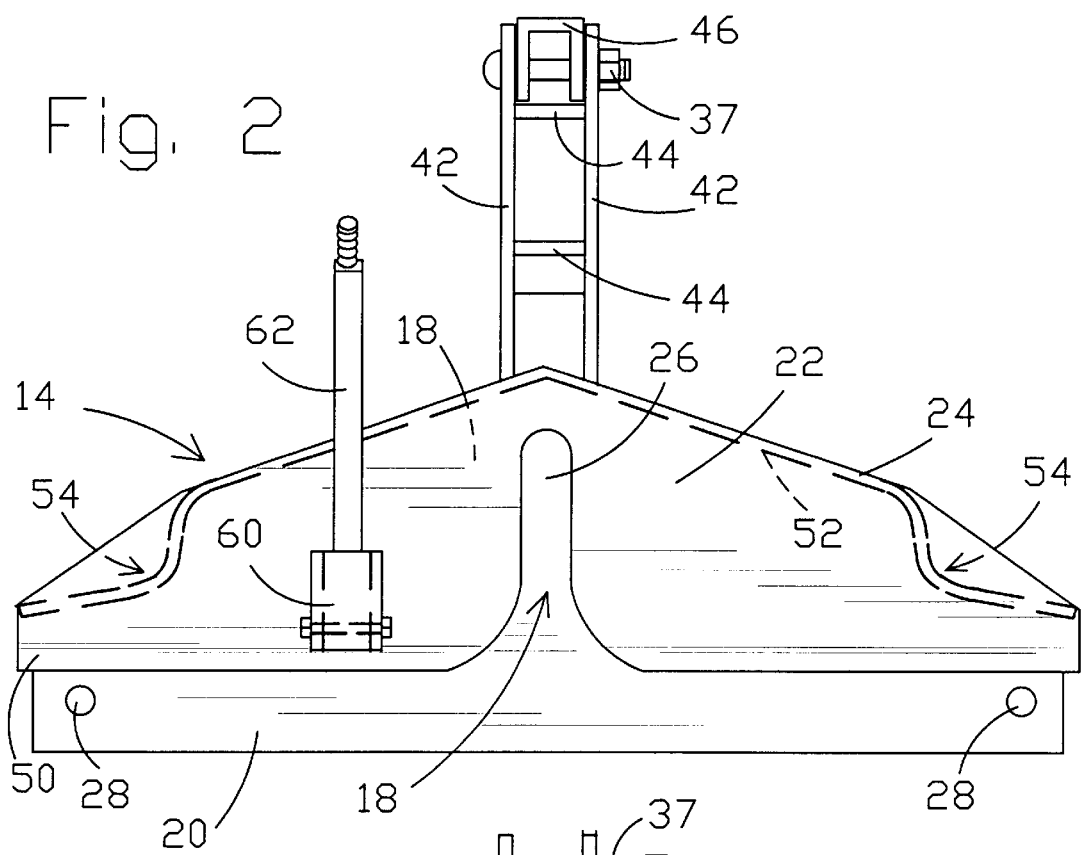
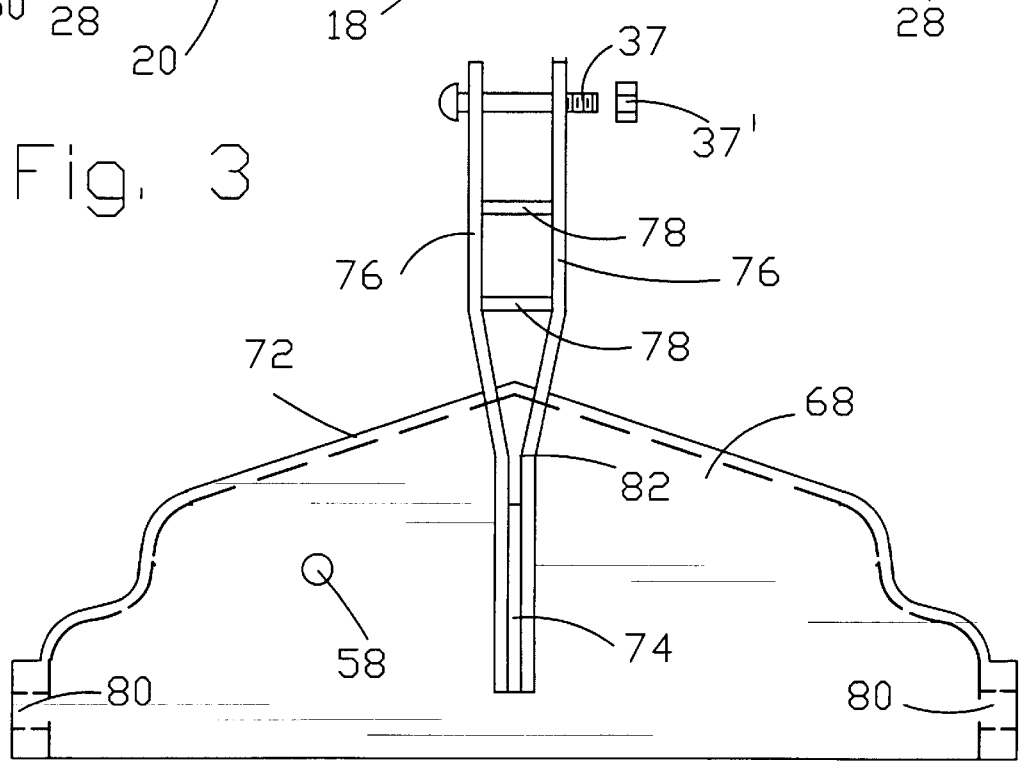

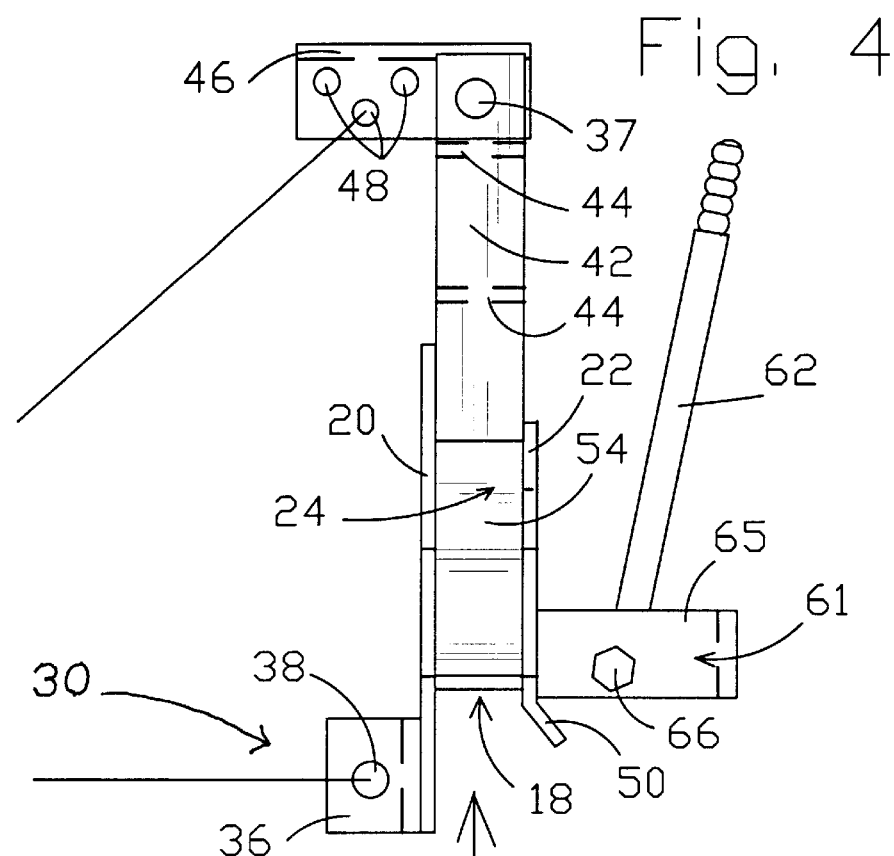
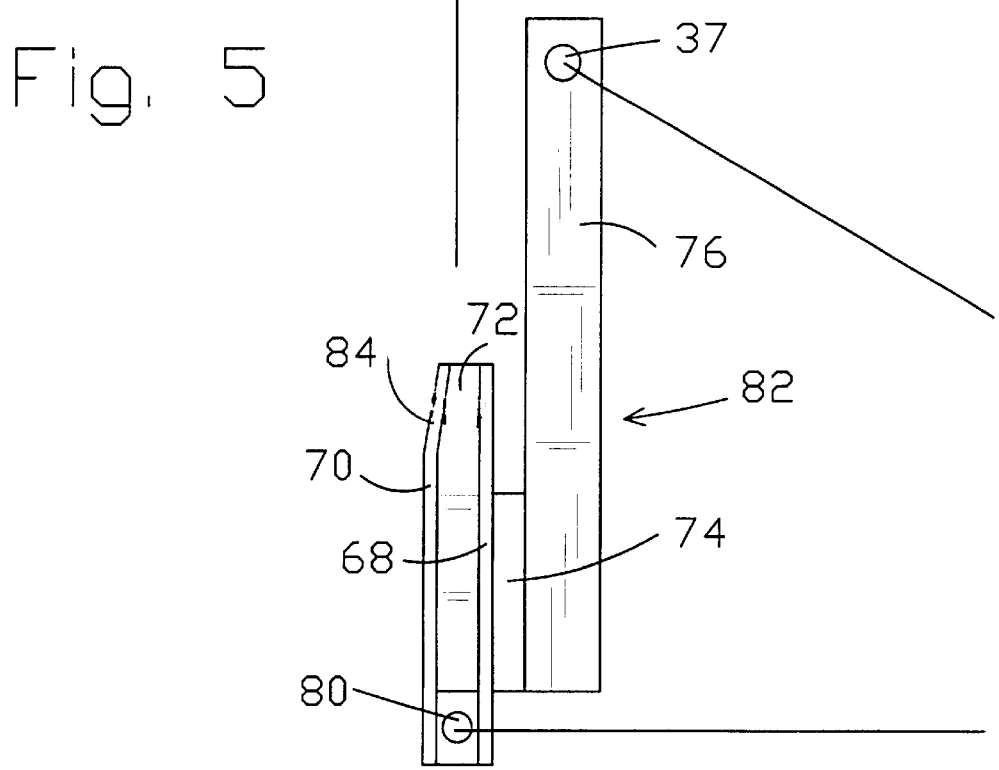

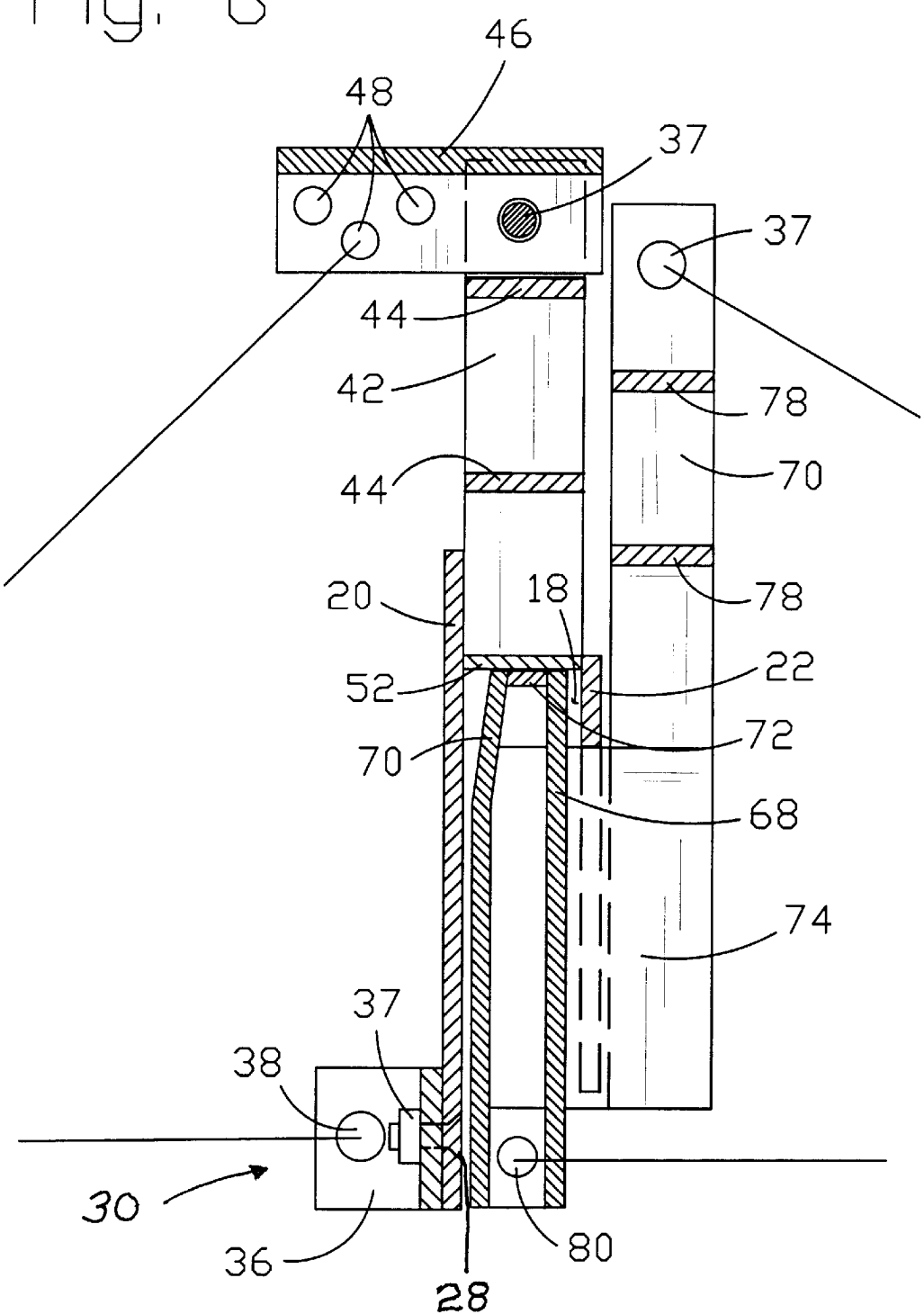

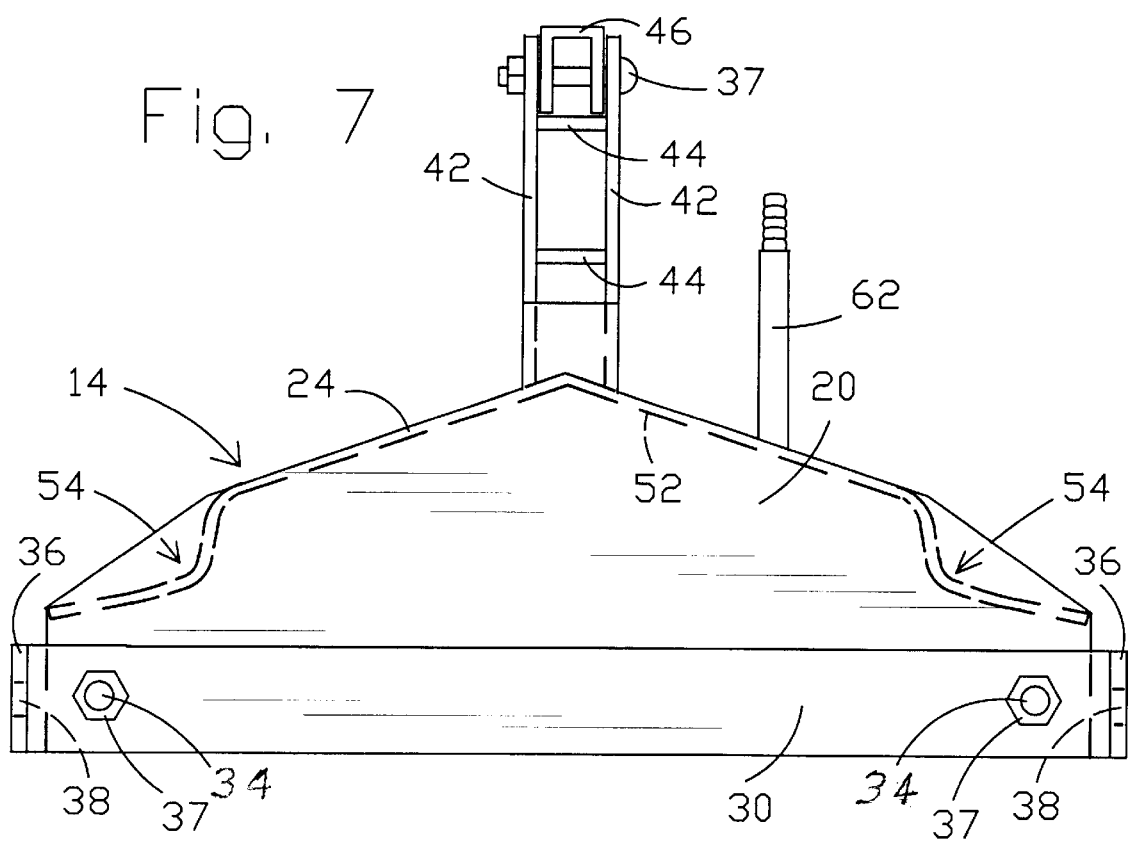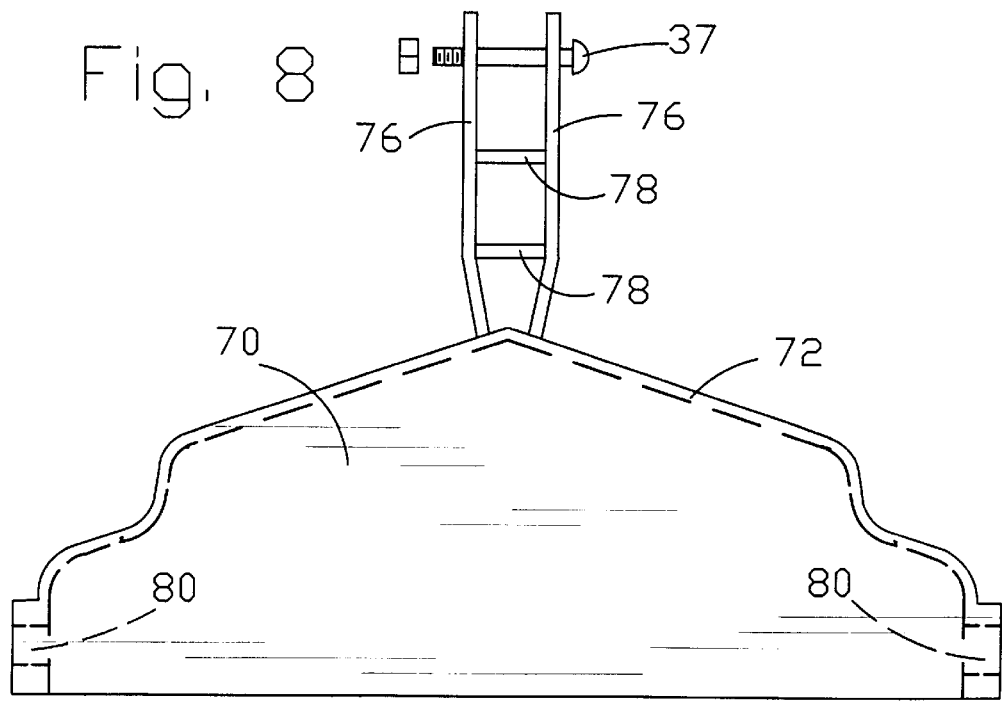

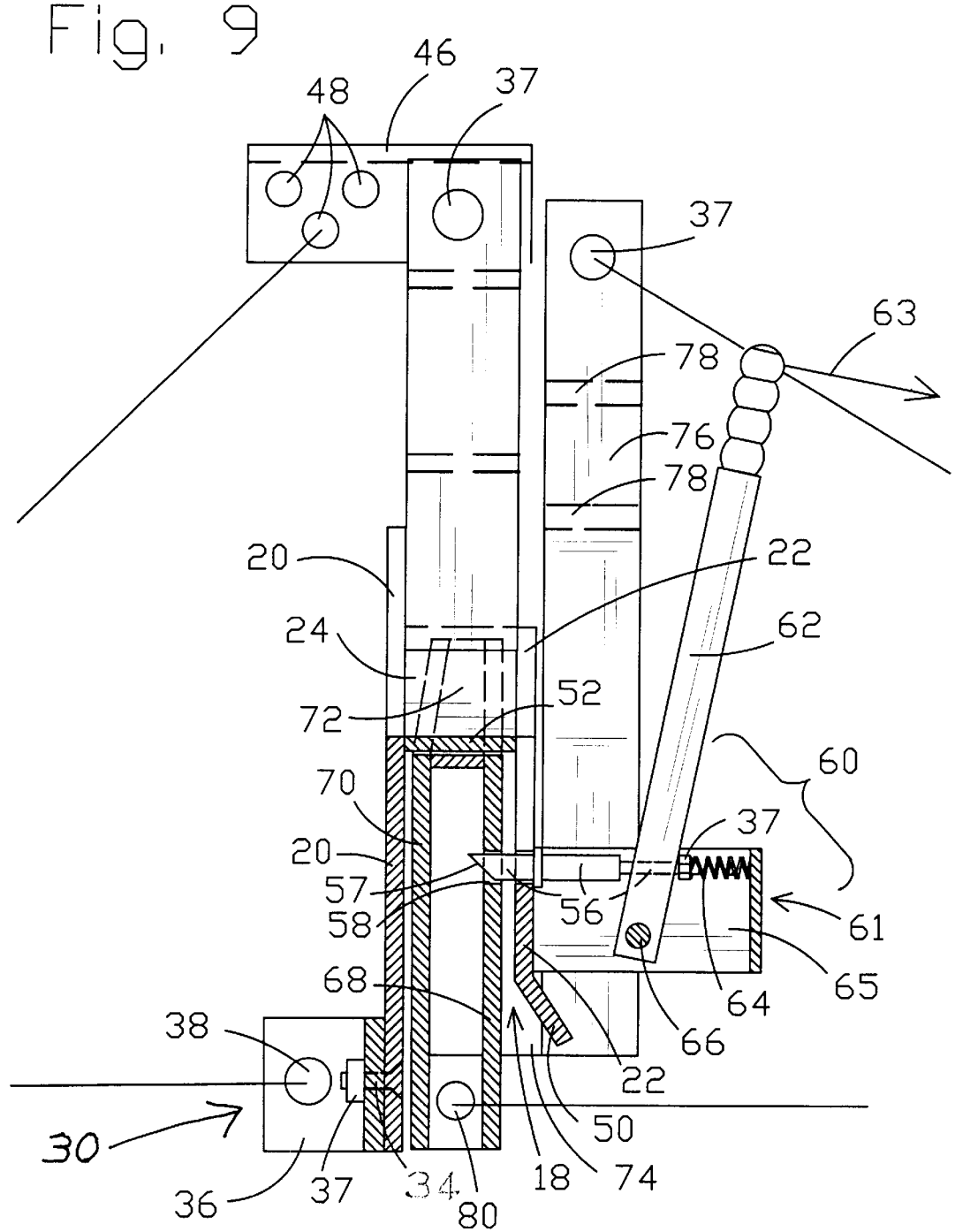

QUICK CONNECT TRACTOR HITCH COUPLING

BACKGROUND OF THE INVENTION

This invention is directed to farm equipment, and more specifically, a quick connecting tractor hitch that allows an operator to remain on the tractor to complete a hitch connection.

Various hitch assemblies have been disclosed in several U.S. patents, including U.S. Pat. Nos. 5,901,792, 5,738,176, and 5,647,441. However, many of these hitches are overly burdensome and unnecessarily complicated. Most require exact alignment with the implement in order to properly connect to the tractor hitch. Most require additional cumbersome and inconvenient components such as locking pins or bolts which require the operator to leave the tractor to complete a hookup. Other hitches claim to be self-aligning but provide for only a small margin of misalignment. Many of this hitches are incompatible with some farm implements and are incapable of being safely adapted for hook up.

The present invention provides a quick connecting hitch assembly for use drawn implements and powered machines which overcomes the problems associated with the prior art. The present invention provides a universal quick connecting hitch assembly that can be safely adapted for use with a variety of different implements, particularly farm implements. Additionally, the present invention eliminates the cumbersome and inconvenient components such as locking pins or bolts which require the operator to leave the powered machine to complete a hookup. Also, the present invention provides a large margin for misalignment that still results in proper hookup which eliminates the need for the operator to force control arms and other components into position. Furthermore, the present invention provides greater structural strength and reliability than other quick connect hitch assemblies.

Accordingly, an object of the present invention is to provide a hitch assembly which allows an operator to remain on the powered machine to complete a hook up procedure.

Another object of the present invention is to provide a hitch assembly which is self-aligning and eliminates the need for perfect alignment and prevents the operator from having to force components into position to complete a hook up.

Still another object of the present invention is to provide a hitch assembly which allows for a quick interchange of implements by eliminating the need for securing pins and adjusting control arms into alignment.

Still another object of the present invention is to provide a universal hitch assembly which can be adapted to fit a variety of implements.

SUMMARY OF THE INVENTION

The above objectives are accomplished according to the present invention by providing a quick hitch coupling for use with a powered machine and a drawn machine. The quick hitch coupling comprises a receiving unit attached at a forward end of a work unit (drawn machine) in a substantially stationary position and an engaging unit attached to the powered machine which may be lowered and raised. The receiving unit comprises a cavity defined between a substantially vertically disposed rear plate laterally spaced from a substantially vertically disposed front plate. The engaging unit attaches to the powered machine in a manner to be movable between at least an elevated operative engaged position and a lowered disengaged position. The engaging unit includes a substantially vertical plate of a size and shape to fit within, and substantially fill, the cavity of the receiving unit. As a result, the engaging unit may be positioned in its lowered position beneath the cavity of the receiving unit and raised to its operative position into coupled engagement with the receiving unit.

The engaging unit is attached to a hydraulically controlled three point hitch carried by the powered machine. The three point hitch being operative to move the engaging unit between the lowered disengaged position and elevated operative engaged position. In the operative position, the hitch is coupled with the drawn machine in its work position to perform the desired task. The hitch is also capable of an elevated transport position, whereby the hitch is coupled with the drawn machine in a further elevated position, above the work position, for transport by the powered machine.

The front plate of the receiving unit includes a positioning cam. The cam acts to locate and guide the engaging unit into the receiving units cavity during a coupling procedure. The cam is centrally disposed between opposed sides of the receiving units front plate. The cam comprises a substantially vertically disposed groove formed in the front plate.

The engaging unit includes a cam follower attached to its side adjacent to said powered machine. The engaging unit also includes a vertically disposed attachment member carried by the cam follower. The vertically disposed attachment member engages with an attachment member of the powered machine above an upper surface of the engaging plate. The vertically disposed attachment member includes two vertically extending support arms spaced by interlocking cross members which provide structural strength. Openings are provided on the opposed sides of the engaging unit for attaching to lower support members of the powered machine, thereby completing a standard three point hitch connection.

The quick hitch coupling including a locking hole in the engaging plate. A locking pin carried by the receiving unit is adapted to engage the locking hole when the engaging plate is properly positioned within the receiving units cavity. A release mechanism operative to remove the pin from the locking hole for uncoupling of the hitch is provided and carried on the front plate of the receiving unit.

The receiving unit also includes engaging openings formed in the rear plate at the lower distal ends for securing the receiving unit to the drawn machine. To provide for greater versatility in attaching the quick hitch coupling to the drawn machine, the hitch includes first and second adaptors adapted to engage with the engaging openings and selected connection points of the drawn machine. The first adaptor comprises a bar with perpendicular connectors at each end. The second adaptor comprises a pair of substantially square spacers. The receiving unit further includes a pair of vertically extending support arms for securing with the drawn machine. The receiving unit support arms are generally parallel and are spaced by interlocking cross members which provide structural strength. The receiving unit also includes a support arm adaptor connected to the support arms. The adaptor being structured to connect with various drawn machines to provide for greater versatility of the quick hitch coupling.

An upper surface of the engaging unit and an upper inner surface of the receiving unit extend along axes forming acute and obtuse angles. The upper surface of the engaging unit extends along angles substantially aligned with angles along which the inner upper surfaces of the receiving unit extend, thereby providing a uniform and flush connection between the engaging unit and receiving unit.

A lower edge of the front plate is flared out in the direction away from the rear plate for assisting in engagement and release of the engaging unit with the receiving unit.

The engaging unit includes a second substantially vertical plate laterally spaced from the vertical plate. The vertical plate and second vertical plate are interconnected along their outer edge, thereby forming an engaging unit of sufficient volume to fill the cavity of the receiving unit.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 2 shows a front view of the receiving unit;

FIG. 3 shows a front view of the engaging unit on the side which attaches to the powered machine;

FIG. 4 shows a side view of the receiving unit;

FIG. 5 shows a side view of the engaging unit;

FIG. 6 shows a cross section of the units coupled together;

FIG. 7 shows a rear view of the receiving unit on the side which attaches to the implement;

FIG. 8 shows a rear view of the engaging unit;

FIG. 9 shows a cross section of the units coupled together with locking elements;

DESCRIPTION OF THE PREFERRED EMBODIMENTS

Figure 1:
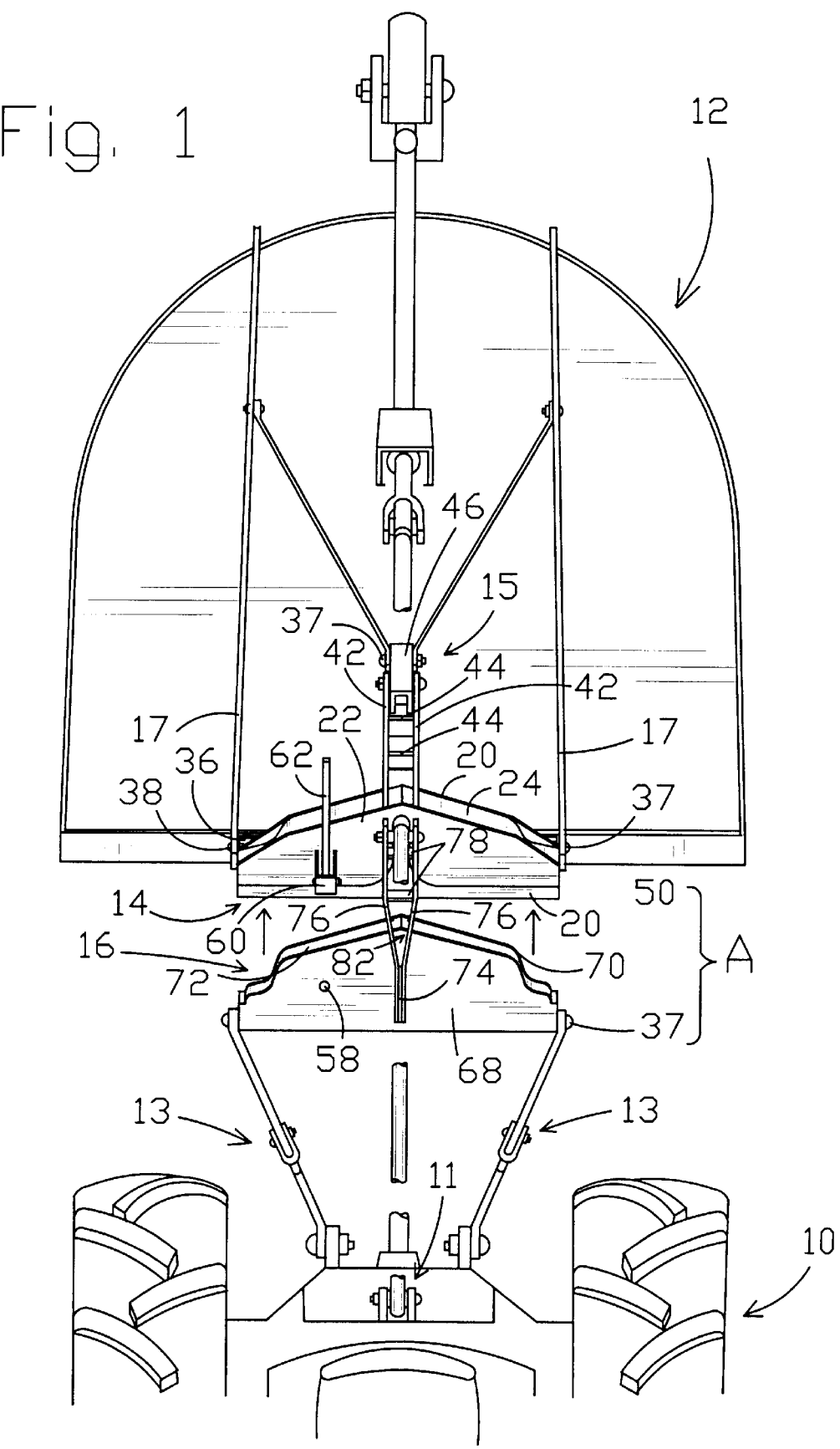
FIG. 1 shows a ¾ top perspective view of the engaging and receiving unit attached to the powered machine and implement.
Figure 10:
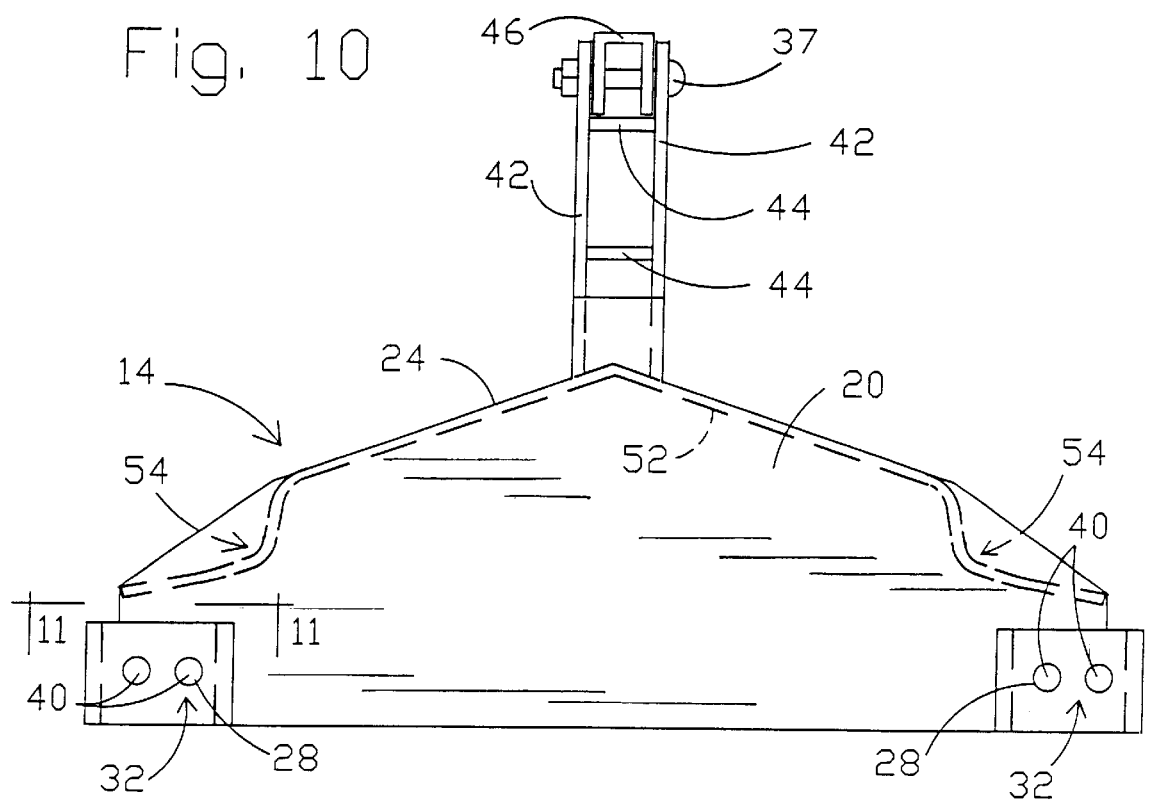
FIG. 10 shows a front view of the coupling unit with attached adaptor.
Figure 11:
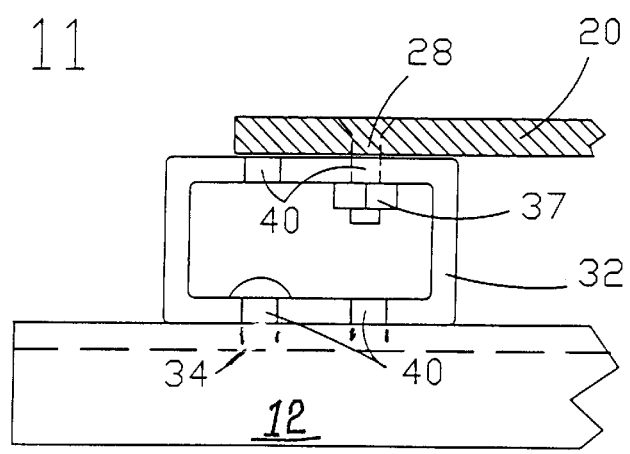
FIG. 11 shows a top view of an adaptor attached to the receiving unit and implement.

Referring now in more detail to the drawings, the invention will now be described in more detail. Referring to FIG. 1, a quick hitch coupling, shown generally as A, is attached to a powered machine 10 and drawn machine 12 by way of a three point hitch connection 11,13,15,17, common among many types of equipment. The quick hitch coupling comprises a receiving unit 14 attached at a forward end of the drawn machine 12 in a substantially stationary position and an engaging unit 16 attached to the powered machine 10 which may be lowered and raised to perform the coupling procedure through the use of hydraulic components carried by the powered machine.

Referring to FIGS. 1, 2, and 4, the receiving unit 14 comprises a cavity 18 defined between a substantially vertically disposed rear plate 20 laterally spaced from a substantially vertically disposed front plate 22 by spacer 24. Spacer 24 forms the upper inner surface 52 of the receiving unit which extends along the entire axis forming acute and obtuse angles. The angles of spacer 24 combine to form shoulders 54 on each side of the receiving unit for engagement with the engaging unit to help stabilize the hitch. The front plate 22 includes a positioning cam 26 to guide the engaging unit 16 into place during a coupling procedure.

The cam 26 is centrally disposed between opposed edges of front plate 22 and comprises a substantially vertically disposed groove. The receiving unit also includes engaging openings 28 formed in the rear plate 20 at the tower distal ends for securing the receiving unit to the drawn machine.

Referring to FIGS. 4, 5, 6, 7, 10, and 11, the receiving unit includes first and second adaptors 30,32 adapted to engage with the engaging openings 28 and selected connection points 34 of drawn machine 12, to provide for greater versatility in attaching the quick hitch coupling to the drawn machine. The first adaptor 30 comprises a flat bar extending past opposed ends of the side of rear plate 20 with perpendicular connectors 36 at each end with an opening 38, adapted for connecting to the drawn machine, extending horizontally away from rear plate 20.

The second adaptor 32 comprises a pair of substantially square spacers each with a plurality of openings 40 adapted to aligned with a selected opening point 34 in the drawn machine. Bolts are passed through openings 34, 40 to connect the two together. The adaptors are attached to be engaged with openings 28 by way of nuts and bolts 37 or other common securing means. The engaging openings and adaptors are used to connect the receiving unit to the lower front surface of drawn machine 12.

Referring to FIG. 2, 4, and 9 the receiving unit further includes a pair of vertically extending support arms 42 for securing with the drawn machine. The receiving unit support arms are generally parallel and are spaced by interlocking cross members 44 which provide structural strength. A support arm adaptor 46 connected between the upper ends of the support arms is provided for multiple connecting points as shown in FIG. 9. The adaptor is pivotally mounted and extends in a rearward direction away from rear plate 20. A plurality of openings 48 are arranged to connect with upper hitch connector 15 of various types and brands of drawn machines to provide for greater use of the quick hitch coupling.

Referring to FIG. 4, the lower edge 50 of the front plate 22 is flared out in the direction away from the rear plate 20 for assisting in the engagement and release of the engaging unit 16 with the receiving unit 14.

Referring to FIG. 9, the front plate 22 of the receiving unit 14 carries a locking pin 56 adapted to engage locking hole 58 formed in engaging plate 68 when the engaging plate is properly positioned within the receiving units cavity 18. A release mechanism 60 carried on the front plate 22 of the receiving unit 14 is provided to remove the locking pin 56 from the locking hole 58 for uncoupling of the quick hitch. The release mechanism 60 comprises a housing 61 attached to the front plate 22 which houses the locking pin 56, lever arm 62, spring 64 and rod 66. The lever arm 62 is pivotally attached to rod 66 which is secured between the sides of the housing 65. The lever arm is further secured to locking pin 56. When the lever arm 62 is pivoted in a direction away from the quick hitch, as shown by arrow 63, spring 64 is compressed and the locking pin pulled from the locking hole, which provides the means for disengaging coupling units 14 and 16 after coupling. Spring 64 normally manipulates locking pin 56 in an extended engagement position. The end of locking pin 56 is angled 57 to allow engaging plate 68 to push the locking pin back as the engaging plate slides into position. Once the locking hole 58 is aligned in proper position with the locking pin, the spring will force the locking pin to engage the locking hole and prevent the units from separating until the release lever arm 62 disengages the locking pin.

Referring to FIG. 1, 2, 3, 5, and 8, the engaging unit 16 attaches to the powered machine 10 in a manner to be movable between at least an elevated operative engaged position and a lowered disengaged position. The engaging unit 16 includes a substantially vertical plate 68 of a size and shape to fit within, and substantially fill, the cavity 18 of the receiving unit 14.

Engaging unit 16 consists of a pair of substantially vertical plates 68 and 70 which are laterally spaced and interconnected along their outer edges by a spacer 72. Vertical plate 68 and second vertical plate 70 are showed with outwardly and downwardly extending upper edges which turn at two points in substantially vertical directions to form a silhouette which substantially conforms with the interior area of receiving unit 14. The lower substantially vertical extensions of spacer 72 contain openings 80 for connecting with hitch members 13.

Vertical plate 68 includes vertically disposed attachment member 82 connected substantially along its mid-point by way of horizontal extension 74. A pair of vertical support arms 76 are connected with the outer end of extension 74 and extend upwardly in spaced manner. Cross members 78 are secured between arms 76 for stability. Openings adjacent upper ends of arms 76 connect with hitch connector 11 by way of nut and bolt 37, 37'.

Vertical plate 70 is tapered slightly forwardly as shown at 84 to assist in allowing ease of entry and exit of the engaging unit with the receiving unit.

Extension 74 functions as a cam follower which acts to move along cam 26 during insertion of engaging member 16 within receiving member 14. Cam 26 in combination with cam follower 74 act to insure that engaging member 16 is properly positioned within the receiving member.

Referring to FIGS. 4 and 5, the engaging unit may be positioned in its lowered position beneath the cavity of the receiving unit and raised to its operative position into coupled engagement with the receiving unit. The engaging unit is attached to a hydraulically controlled three point hitch 11,13 carried by the powered machine. The three point hitch being operative to move the engaging unit 16 between the lowered disengaged position and elevated operative engaged position. In the operative position, the hitch is coupled with the drawn machine in its work position to perform the desired task. The hitch is also capable of an elevated transport position, whereby the hitch is coupled with the drawn machine in a further elevated position, above the work position, for transport by the powered machine.

The upper surface of the engaging unit extends along angles substantially aligned with angles along which the inner upper surfaces 52 of the receiving unit extend, thereby providing a uniform and flush connection between the engaging unit and receiving unit during coupling.

While a preferred embodiment of the invention has been described using specific terms, such description is for illustrative purposes only, and it is to be understood that changes and variations may be made without departing from the spirit or scope of the following claims.

What is claimed is:

1. A quick hitch coupling for use with a powered machine and a drawn machine comprising:
    a receiving unit attached at a forward end of said drawn machine in a substantially stationary position;
    said receiving unit comprising a cavity defined between a substantially vertically disposed rear plate laterally spaced from a substantially vertically disposed front plate;
    an engaging unit attached with said powered machine in a manner to be movable between at least an elevated operative engaged position and a lowered disengaged position, said engaging unit including a substantially vertical plate of a size and shape to fit within and substantially fill said cavity;
    said engaging unit further including a second substantially vertical plate horizontally spaced from said vertical plate, said vertical plate and said second vertical plate being interconnected along their outer edges; whereby said engaging unit may be positioned in its lowered position beneath said cavity of said receiving unit and raised to its operative position and into coupled engagement with said receiving unit.

2. The hitch of claim 1 wherein said engaging unit is attached to a hydraulically controlled three point hitch carried by said powered machine, said hitch being operative to move said engaging unit between said lowered disengaged position and elevated operative engaged position, said operative position where said hitch is coupled with said drawn machine in its work position and an elevated transport position where said hitch is coupled with said drawn machine in a further elevated position for transport by said drawn machine.

3. The hitch of claim 1 wherein said front plate includes a positioning cam, said cam acting to locate said engaging unit within said cavity during coupling.

4. The hitch of claim 3 wherein said cam is centrally disposed between opposed sides of said front plate.

5. The hitch of claim 3 wherein said cam comprises a substantially vertically disposed groove formed in said front plate.

6. The hitch of claim 1 wherein said engaging unit includes a cam follower attached to its side adjacent to said powered machine.

7. The hitch of claim 6 wherein said engaging unit includes a vertically disposed attachment member carried by said cam follower, said vertically disposed attachment member engaging with an attachment member of said powered machine above an upper surface of said engaging plate.

8. The hitch of claim 7 wherein said vertically disposed attachment member includes two vertically extending support arms spaced by interlocking cross members for structural strength.

9. The hitch of claim 1 wherein said receiving unit includes engaging openings formed in said rear plate at the lower distal ends for securing with said drawn machine.

10. The hitch of claim 9 including first and second adaptors adapted to be engaged with said engaging openings and selected of said drawn machine.

11. The hitch of claim 10 wherein said first adaptor comprises a bar with perpendicular connectors at each end.

12. The hitch of claim 10 wherein said second adaptor comprises a pair of substantially square spacers.

13. A quick hitch coupling for use with a powered machine and a drawn machine comprising:
    a receiving unit attached at a forward end of said drawn machine in a substantially stationary position;
    said receiving unit comprising a cavity defined between a substantially vertically disposed rear plate laterally spaced from a substantially vertically disposed front plate;
    an engaging unit attached with said powered machine in a manner to be movable between at least an elevated operative engaged position and a lowered disengaged position, said engaging unit including a substantially vertical plate of a size and shape to fit within and substantially fill said cavity;

said engaging unit further including openings on opposed sides for attaching with lower support members of said powered machine; whereby said engaging unit may be positioned in its lowered position beneath said cavity of said receiving unit and raised to its operative position and into coupled engagement with said receiving unit.

14. The hitch of claim 13 including a locking hole in said vertical plate.

15. The hitch of claim 14 including a locking pin carried by said receiving unit, said locking pin being adapted to engage said locking hole when said engaging plate is properly positioned within said cavity.

16. The hitch of claim 15 including a release mechanism operative to remove said locking pin from said locking hole for uncoupling of said hitch.

17. The hitch of claim 16 wherein said release mechanism is carried on said front plate.

18. A quick hitch coupling for use with a powered machine and a drawn machine comprising:

a receiving unit attached at a forward end of said drawn machine in a substantially stationary position;

said receiving unit comprising a cavity defined between a substantially vertically disposed rear plate laterally spaced from a substantially vertically disposed front plate;

said receiving unit further includes a pair of vertically extending support arms for securing with said drawn machine;

an engaging unit attached with said powered machine in a manner to be movable between at least an elevated operative engaged position and a lowered disengaged position, said engaging unit including a substantially vertical plate of a size and shape to fit within and substantially fill said cavity; whereby said engaging unit may be positioned in its lowered position beneath said cavity of said receiving unit and raised to its operative position and into coupled engagement with said receiving unit.

19. The hitch of claim 18 wherein said receiving unit support arms are generally parallel and are spaced by interlocking cross members for structural strength.

20. The hitch of claim 18 including an adaptor connected with said support arms, said adaptor being structured to connect with various drawn machines.

21. The hitch of claim 18 wherein an upper surface of said engaging unit and an upper inner surface of said receiving unit extend along axes forming acute and obtuse angles.

22. The hitch of claim 21 wherein said upper surface of said engaging unit extends along angles substantially aligned with angles along which said inner upper surfaces of said receiving unit extend.

23. The hitch of claim 18 wherein a lower edge of said front plate is flared out in the direction away from said rear plate for assisting in engagement and release of said engaging unit with said receiving unit.

24. The hitch of claim 18 wherein said engaging unit includes a second substantially vertical plate horizontally spaced from said vertical plate, said vertical plate and said second vertical plate being interconnected along their outer edges.

* * * * *